US012792340B2

(12) United States Patent
Verma et al.

(10) Patent No.: US 12,792,340 B2

(45) Date of Patent: Nov. 10, 2026

(54) METHOD AND SYSTEM FOR INTELLIGENT ROUTING OF SOFTWARE CHANGES

(71) Applicant: Microsoft Technology Licensing, LLC, Redmond, WA (US)

(72) Inventors: Nidhi Verma, Bellevue, WA (US); Chandra Sekhar Inguva, Salt Lake City, UT (US); Michael John Neuburger, Snoqualmie, WA (US); Amy Leigh Josefczyk, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 18/631,281

(22) Filed: Apr. 10, 2024

(65) Prior Publication Data

US 2025/0321725 A1 Oct. 16, 2025

(51) Int. Cl.

| | |
|---|---|
| ***G06F 8/65*** | (2018.01) |
| ***G06F 8/60*** | (2018.01) |
| ***G06F 8/71*** | (2018.01) |
| ***G06F 40/20*** | (2020.01) |

(52) U.S. Cl.

CPC ................ *G06F 8/65* (2013.01); *G06F 40/20* (2020.01)

(58) Field of Classification Search

CPC ... G06F 8/65; G06F 40/20; G06F 8/60; G06F 8/71

See application file for complete search history.

(56) References Cited

U.S. PATENT DOCUMENTS

| | | | | |
|---|---|---|---|---|
| 2019/0317754 | A1* | 10/2019 | Mosquera | G06F 11/3495 |
| 2020/0097845 | A1* | 3/2020 | Shaikh | G06Q 30/0201 |
| 2023/0161882 | A1* | 5/2023 | Kumar | G06F 11/3688 726/25 |
| 2025/0117212 | A1* | 4/2025 | Schrieber | G06F 8/70 |
| 2025/0123946 | A1* | 4/2025 | Eberlein | G06F 11/302 |
| 2025/0156161 | A1* | 5/2025 | Cowan | G06F 40/20 |

* cited by examiner

*Primary Examiner* — Daxin Wu

(74) *Attorney, Agent, or Firm* — Han Gim; Newport IP, LLC

(57) ABSTRACT

A data processing system includes a processor, and a memory storing executable instructions which, when executed by the processor, causes the processor, alone or in combination with other processors, to implement: a united data platform for extracting data from a software release pipeline for specific software; a software change insights module to generate insights into changes to the specific software on a per build basis using the extracted data; a deployment insights module to generate deployment insights using the extracted data; and a dashboard to organize the generated insights and intelligently route deployment of a build to upgrade the specific software based on the generated insights to expedite deployment.

20 Claims, 8 Drawing Sheets

METHOD AND SYSTEM FOR INTELLIGENT ROUTING OF SOFTWARE CHANGES

BACKGROUND

Software deployment is the process of making a software system available for use. It involves various activities, such as building, testing, packaging, releasing, installing, configuring, and updating the software. Software developers utilize iterative processes, referred to as DevOps, to deploy software to customers. As part of the DevOps process, developers regularly merge their code changes to repositories. Software builds are then created which can be tested, released and deployed to customer environments.

These software deployments include build and release artifacts which include details of deployment activity, build information, pull requests (PRs), testing and developer information. Particularly for large-scale applications used on a global basis, these software deployments can contain many such artifacts and software code variations. Consequently, there is no simple way to understand the contents of all the software deployments in an effective, reliable manner for such purposes as software security audits and smart deployment routing to various user environments to ensure the services are reliable and stable across a global customer base.

The complexity of continuous software development that involves many developers and others working together presents a technical problem to effectively comprehend the development in terms of changes from build to build, artifacts, etc.

SUMMARY

In one general aspect, the following description presents a data processing system that includes a processor, and a memory storing executable instructions which, when executed by the processor, causes the processor, alone or in combination with other processors, to implement: a united data platform for extracting data from a software release pipeline for specific software; a software change insights module to generate insights into changes to the specific software on a per build basis using the extracted data; a deployment insights module to generate deployment insights using the extracted data; and a dashboard to organize the generated insights and intelligently route deployment of a build to upgrade the specific software based on the generated insights to expedite deployment.

In another general aspect, the following description presents a method that includes: extracting data from a software release pipeline for specific software; generating insights into changes to the specific software on a per build basis using the extracted data; generating deployment insights using the extracted data; and intelligently routing deployment of a build to upgrade the specific software based on the generated insights to expedite deployment.

In another general aspect the following description presents a data processing system that includes: a processor, and a memory storing executable instructions which, when executed by the processor, causes the processor, alone or in combination with other processors, to implement: a united data platform for extracting data from a software release pipeline for specific software; a software change insights module to generate insights into changes to the specific software on a per build basis using the extracted data; a deployment insights module to generate deployment insights using the extracted data; and a dashboard to organize the generated insights and a database to provide the generated insights for software changes and deployments on a per build basis as queried by administrators of the software release pipeline.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
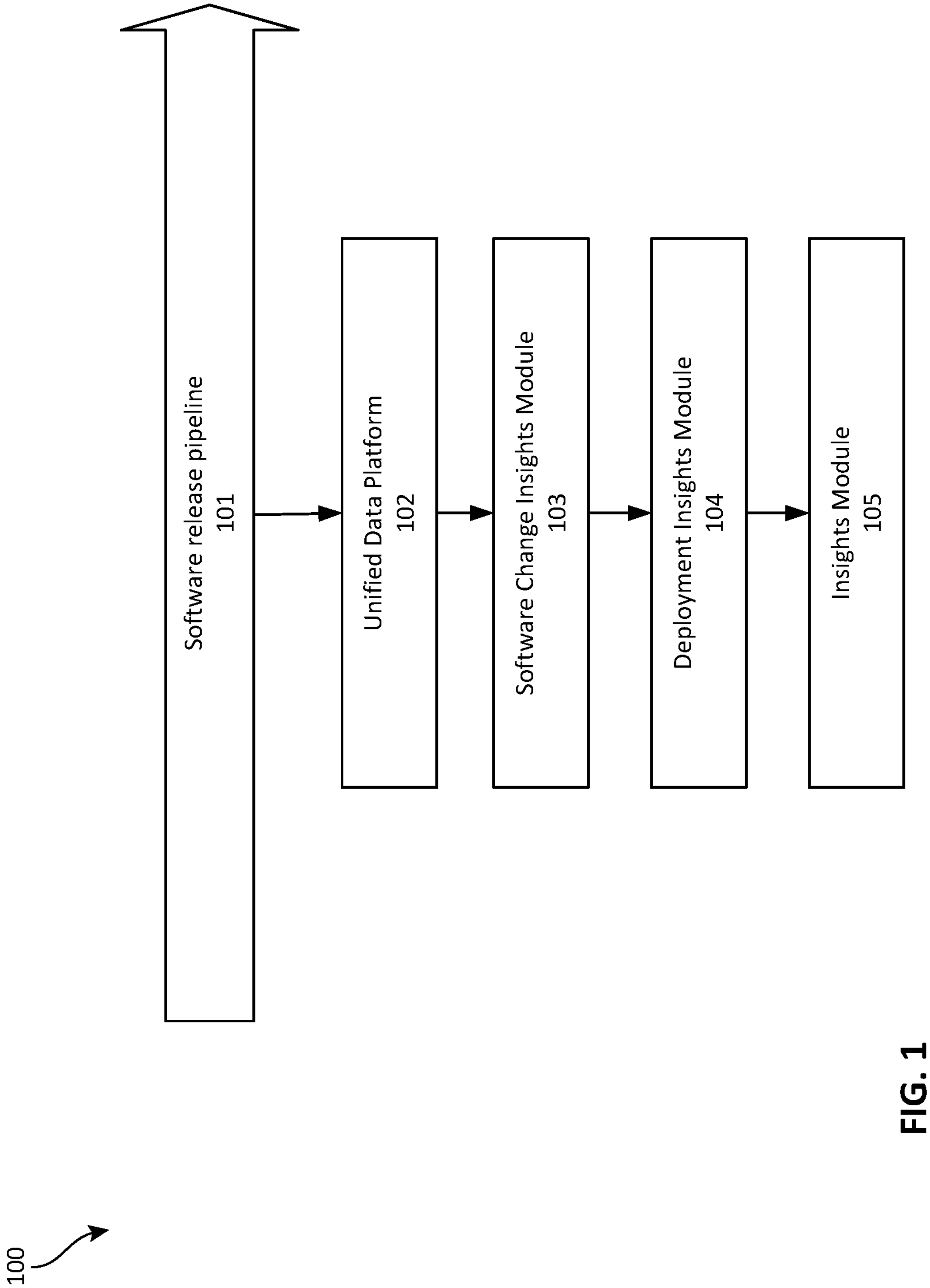
FIG. 1 illustrates a system according to an example of the software release tracking techniques described herein.

Many software applications have components that reside and operate in the cloud with or without corresponding software locally on a user's computer. Some such applications may be used by millions or hundreds of millions of users around the world. Such sophisticated software may be continually under development as developers seek to add new features, fix issues, enhance security or otherwise improve or upgrade the software. As these improvements are developed, it is necessary rollout the changes to all the software that comprises the application, both in the cloud and perhaps on user's local systems. The system for implementing or deploying these changes is referred to as a software release pipeline.

Within a software release pipeline, developers submit changes to the software as pull requests (PRs) against a source code data repository. This repository, which is central to the version control system, maintains a historical record of all changes, facilitating collaboration among developers and enabling the tracking of modifications over time.

Upon the approval and merging of pull requests, the system triggers the software build process. This process involves compiling the source code into executable artifacts.

It may also include the execution of unit tests, integration tests, and any other quality assurance measures to ensure the reliability and stability of the software. The successful completion of the build process results in the generation of build artifacts, which are then stored in a build data store. This store serves as a repository for all artifacts generated during the build process, allowing for easy retrieval and management of different software versions.

Following the build phase, the deployment process begins. This process is responsible for distributing and installing the software updates into the production environment. It involves retrieving the appropriate build artifacts from the build data store and executing a series of steps to roll out the updates to the target systems. The deployment process is designed to minimize downtime and ensure that the new software version is seamlessly integrated into the existing infrastructure.

To facilitate the management and tracking of deployments, a deployment data store is utilized. This data store contains detailed records of each deployment, including the software version, deployment time, target environment, and outcome. It provides a comprehensive overview of the deployment history, enabling teams to monitor the rollout of updates and quickly address any issues that may arise.

As noted above, the complexity of continuous software development that involves many developers and others working together presents a technical problem to effectively comprehend the development in terms of changes from build to build, artifacts, etc. To address this technical problem, the following describes using natural language processing and other techniques to automatically perform:

1. Categorizing builds into different types (Client, package upgrades, etc.)
2. Summarizing the contents of a deployment
3. Categorizing the change type (minor, major, medium)
4. Smart deployment routing to various environments The system and method described here uses Large Language Models (LLMs) and summarization modules to categorize the builds and deployments and generate system summaries for a deployment. Using this information, compliance team members, deployment team and incident managers can quickly understand the contents of the releases and help improve the security posture of the software deployment processes. With knowledge of the categories of the builds and change type, administrators can use this information to intelligently route the releases across the customer environments and ensure that rollouts are stable and reliable.

FIG. 1 illustrates a system according to an example of the software release tracking techniques described herein. As shown in FIG. 1, the system 100 includes a software release pipeline 101. A unified data platform 102 collects deployment, build artifacts and process telemetry from the pipeline 101, as will be described in further detail below. The unified data platform cleans, normalizes and transforms the data into a structured format.

More specifically, the unified data platform 102 is responsible for collection deployment data from various sources such as version control systems, release management, artifact retention, build system and other data sources. The unified data platform 102 uses different methods to access data sources, such as Application Programming Interfaces (APIs), Software Development Kits (SDKs), and database queries. The unified data platform 102 has additional capabilities to aggregate and merge the data from different sources based on certain criteria and includes elements that perform data pre-processing steps needed for natural language processing systems. The unified data platform 102 also has quality monitoring and remediation systems to ensure high quality data is available for the users.

The unified data platform 102 communicates with a software change insights module 103. The software change insights module 103 identifies the artifacts related to a particular build and extracts the code changes which are part of that build. Using this as input, a code summarization module 133 (FIG. 3) generates a code summary for each pull request and an aggregated summary of the changes in the corresponding build. After this step, a pull request metrics engine 134 (FIG. 3) categorizes the build into one or more categories (e.g., client, package, bug, version upgrade, security, component upgrade etc.) and categorizes whether the build includes only pull requests approved by humans, automated systems or both. The system also provides insights on build-related failures and false positive successes for security testing. These insights are stored in the unified data platform 102 and exposed to the insights module 105, described in more detail below.

Figure 5:
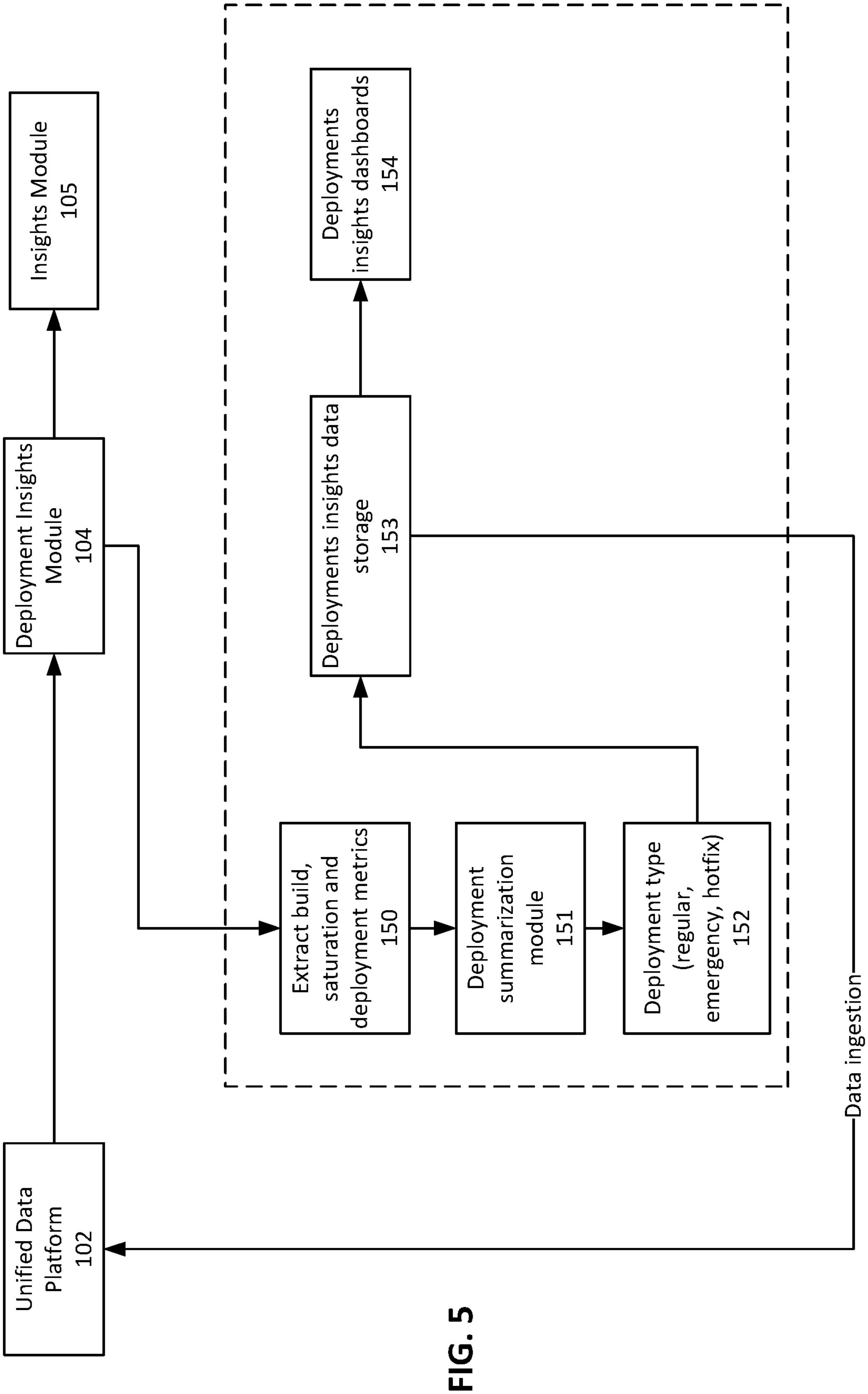
FIG. 5 illustrates an example operation of the deployment insights module from FIGS. 1 and 2.

The system further includes a deployment insights module 104. The deployment insights module 104 identifies the release artifacts, deployment process metrics, and build insights and routes the releases effectively across various customer environments. Once this information is available, a deployment summarization module 151 (FIG. 5) summarizes the deployment into its specific categories (e.g., regular, emergency, hotfix, patch, etc.). These insights are stored in a deployment insights storage 153 (FIG. 5) and integrated to deployment insights dashboards 154 (FIG. 5).

Lastly, an insights module 105 provides automated reporting for the software change insights module 103 and the deployment insights module 104 to various user types. The insights module 105 provides an interface to ask natural language-based questions on the security posture of a deployment, pull request, build artifact and aggregate posture assessment for a service.

Figure 2:
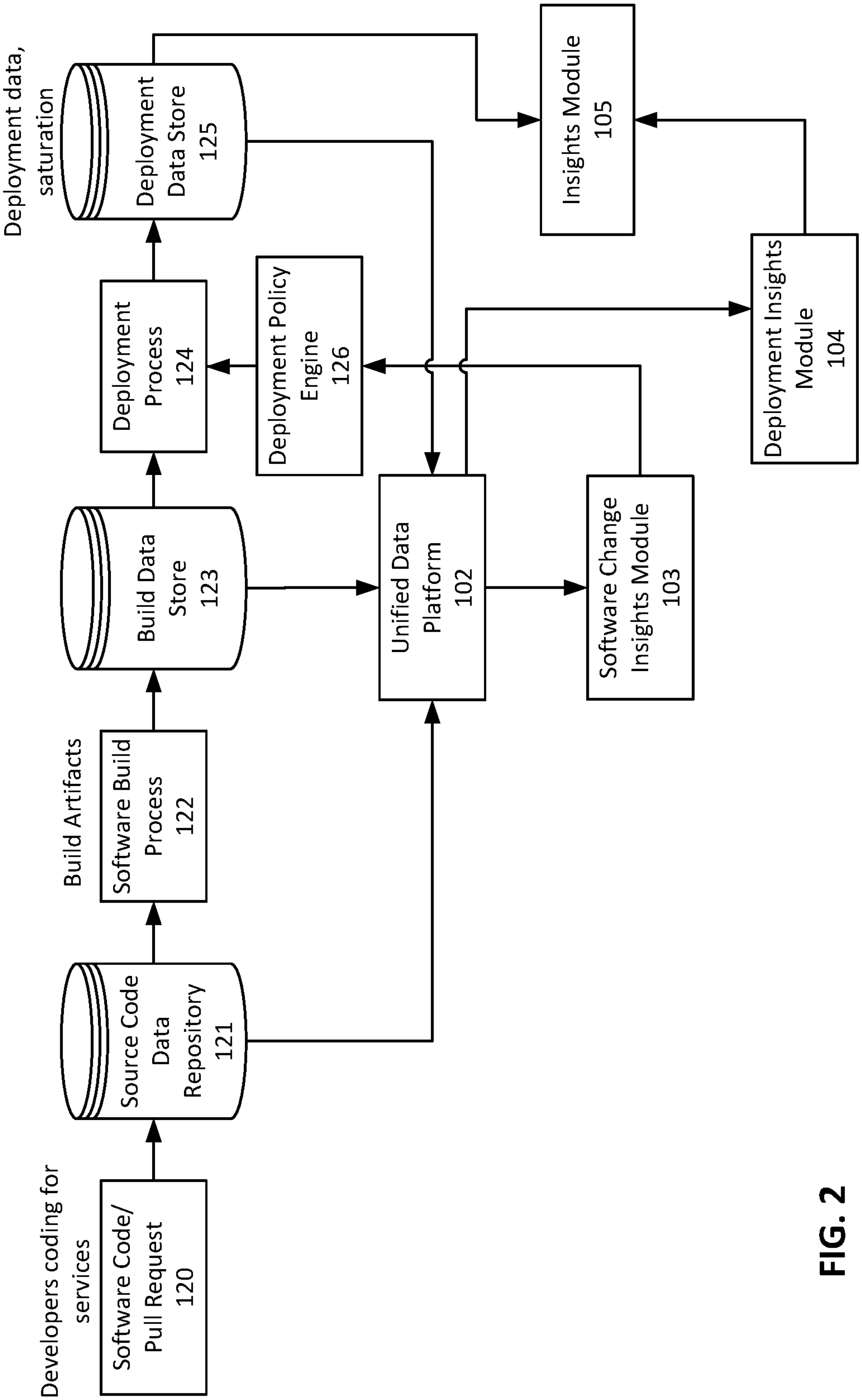
FIG. 2 illustrates additional details of the system in FIG. 1.

FIG. 2 illustrates additional details of the system in FIG. 1. As shown in FIG. 2 and as noted above, the software release pipeline 101 is operated based on software code pull requests (PR) 102 entered by developers that are coding upgrades for the application or service. As developers generate new or upgraded code for the application or service, that new code is stored in a source code data repository 121. To implement the upgrade of the new code, the developer submits a pull request (PR) 120 to the software release pipeline including the source code data repository 121.

This results in a software build process 122, which is compiling the code specified in the pull request. More specifically, the build process 122 executes on source code of the pull request and its dependencies to compile, link, and package the code into a runnable state. This process might include compiling source code into binary code, executing automated tests, performing code analysis, and preparing the software for deployment. The build process is a critical step in software development, ensuring that the software is correctly assembled from its source components and is ready for execution. The term "build" can also refer to the specific instance or version of the software that is being compiled.

A "build artifact" is the output or the result of the build process. These artifacts are the deployable components of the software that are generated once the build process is completed. Artifacts can include binary files, libraries, executables, war files, jar files, documentation, configuration files, and any other files needed for the software to run and be deployed. Essentially, build artifacts are the packaged version of the software that can be deployed to a server or delivered to an end user. These build artifacts are stored in a build data store 123 of the software release pipeline.

The build artifacts are then deployed in a deployment process 124. This deployment process 124 uses intelligent routing for the changed being made, for example, based on categorization of the changes. Specifically, a deployment policy engine 126 uses inputs from the software insights module 103 and orchestrates deployment policies to mitigate risk of inadvertent issues in the release and optimize the speed of the release. The deployment policy engine 126 supports different deployment strategies and customization based on customer environments and policies.

A deployment data store 125 records deployment data or telemetry including saturation, which refers to what percentage of the total user environment has received deployment of the current upgrade. Monitoring and deciphering all that is being performed by the software release pipeline is the system including the unified data platform 102, software change insights module 103, deployment insights module 104 and insights module 105, as described above.

As also shown in FIG. 2, the unified data platform 102 collects data from various points in the software release pipeline. The unified data platform 102 has access to the source code repository 121 and to the build data store 123. Consequently, as will be described below, the system can determine what changes are made by each build and can categorize those changes. The unified data platform 102 also has access to the deployment data store 125 and can, therefore, obtain the deployment data, including saturation, for each build that has been deployed.

Figure 3:
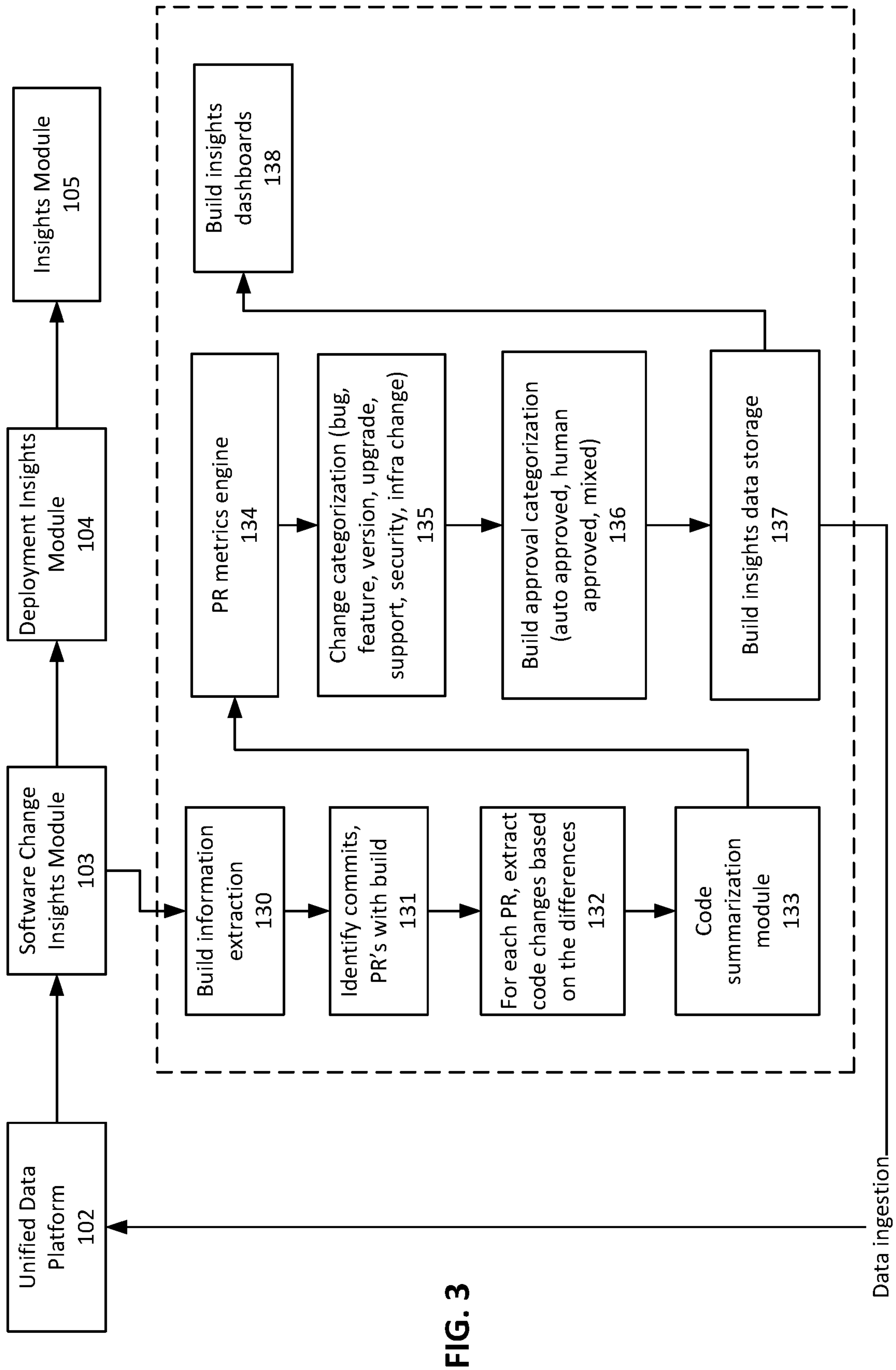
FIG. 3 illustrates an example operation of the software change insight module from FIGS. 1 and 2.

FIG. 3 illustrates an example operation of the software change insight module from FIGS. 1 and 2. As shown in FIG. 3, the data collected by the unified data platform 102 from the software release pipeline is available to the software change insights module 103. In operation, the software change insights module 103 will first extract information for each build, i.e., build information extraction 130. Specifically, the software change insights module 103 will identify the pull requests and commits associated with each build 131. Also, for each pull request, the software change insights module 103 will extract what code changes are being made by the build by differencing the previous and updated code 132.

As noted above, what is actually happening in a particular build may be difficult for an administrator to understand. This difficulty is multiplied when there are a number, perhaps hundreds, of builds being implemented within a relatively short amount of time. To solve this technical problem, a code summarization module 133 will receive the information determined for each build in 130-132 and generate a summary of what is happening. As will be described in more detail below, this summary can be generated using code-trained Large Language Models (LLMs) to produce a summary that is readily intelligible to an administrator and provides an accurate picture of the code changes being implemented by the software release pipeline.

The accumulated data and generated code change summary are input to a pull request metrics engine 134. The pull request metrics engine 134 will associate a change categorization with each build in the summary. For example, the changes may be categorized as bug fixes, implementing new features, a version change, an upgrade, a support change, a security update or infra change 135. The pull request metrics engine 134 may also categorize a build by size, for example, small, medium or large.

Based on the accumulated data, the pull request metrics engine 134 will also indicate for each build how the build was approved. For example, in this build approval categorization 136, the build approval may be indicated as auto approved, human approved or mixed approval. All of this information is stored in a build insights data storage 137. Additionally, this information can be displayed for an administrator in a set of build insights dashboards 138. The data of the build insights data storage 137 is also available to the unified data platform 102 for use elsewhere in the system, as needed, such as by the overall insights module 105.

Figure 4:
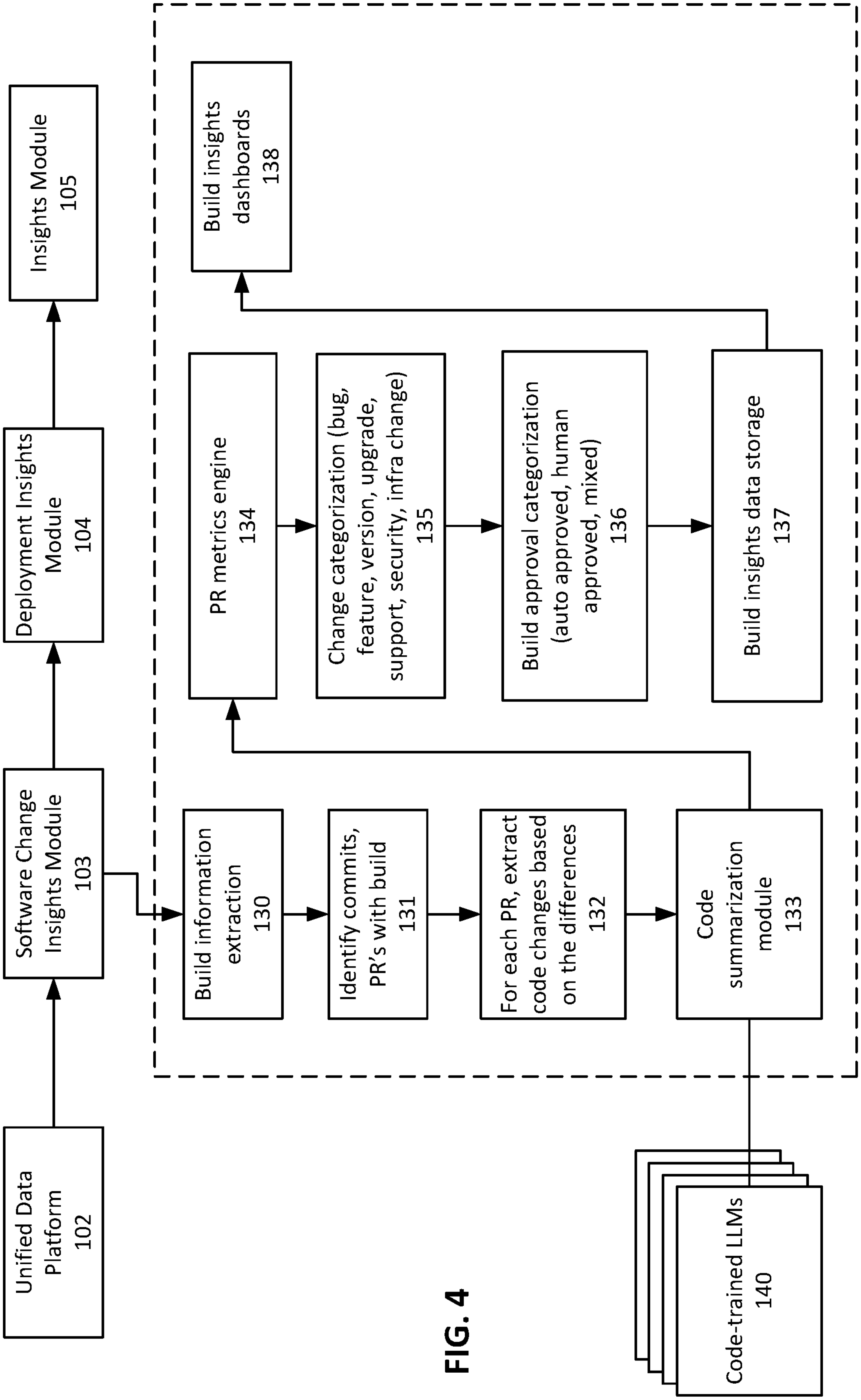
FIG. 4 illustrates additional details of the operation of the software change insight module from FIG. 3.

FIG. 4 illustrates additional details of the operation of the software change insight module from FIG. 3. As mentioned above, the code summarization module 133 will use one or more Large Language Models (LLMs) 140 to generate a summary of a build or number of builds that allows an administrator to understand what the builds are doing or are supposed to be doing in upgrading the application or service.

In common experience, a Large Language Model (LLM) is a type of artificial intelligence (AI) that specializes in processing, understanding, generating, and sometimes translating human language. Common examples are referred to as Generative Pre-trained Transformers (GPTs) These models are "large" in the scope of their training data and the complexity of the tasks they can perform. LLMs are developed through a technique known as machine learning, where the model is exposed to vast amounts of training data. This exposure enables the model to learn patterns, nuances, and the structure of language over time.

At their core, LLMs are built upon neural networks, specifically a variant called transformers, which are adept at handling sequential data like text. The training process involves feeding the neural network examples of text, allowing it to adjust its internal parameters to reduce errors in prediction tasks, such as next-word prediction. Over time, and with enough data and computational power, these models become highly proficient at generating coherent, contextually relevant text based on the instructions or prompt that they receive.

LLMs have a wide range of applications, including but not limited to content generation, summarization, question-answering, and conversational agents. They can understand queries, provide answers, and even generate content that mimics human-like prose. Their ability to process and generate language has made them invaluable tools in enhancing human-computer interaction, automating content creation, aiding in educational tools, and much more.

The LLMs 140, as shown in FIG. 4, are not, however, the commonly known GPTs or the like trained on a vast corpus of natural language documents. Rather, the LLMs 140 are trained on computer code as their training data. Vast amounts of code or code changes with corresponding explanations of what the code or code change is doing constitute the training set of an LLM 140. Each LLM 140 shown in FIG. 4 corresponds to, and is trained on, a different programming language. Such LLMs 140 can be used to generate code based on a description of what the code is supposed to do.

Consequently, the code summarization module 133 will submit the information about a build or a number of builds to an LLM 140 that corresponds to the programming language of the builds. The code summarization module 133 also includes in the prompt to the LLM 140 an instruction to return a summarization of what the build or builds are doing with respect to the application or service in which they are being deployed. Based on their training, the LLMs 140 are then able to return the summary, described above, that explains to an administrator what the build or builds are intended to do in the context of the application or service in which deployed. As described above in connection with FIG. 3, this summary becomes an important part of the pull request metrics that are available to an administrator in the build insight dashboards 138.

FIG. 5 illustrates an example operation of the deployment insights module from FIGS. 1 and 2. In addition to the build insights described above, the deployment insights module 104 provides similar insight into the actual deployment events for each pull request or build. As shown in FIG. 5, the deployment insights module 104 will extract build, saturation and deployment metrics from the software release pipeline via the unified data platform 102. A deployment summarization module 151 is used to organize and summarize this deployment information. This summarization of the deployment information is extremely helpful to administrators if a build being deployed causes a problem with the application or service. In such a case, it is important for the administrators to quickly respond and correct the inadvertent issue caused. The summarization of the deployment information can help the administrator quickly diagnose how and where the issue has been noted for remediation. The deployment type 152 is also categorized, for example, as a regular deployment, emergency deployment, hotfix deployment, etc.)

These accumulated deployment insights are stored in a deployments insights data storage 153 and made available to users through corresponding deployment insights dashboards 154. As above, the accumulated information in the deployments insights data storage 153 is available to the unified data platform 102 for use elsewhere in the system, such as by the overall insights module 105.

Figure 6:
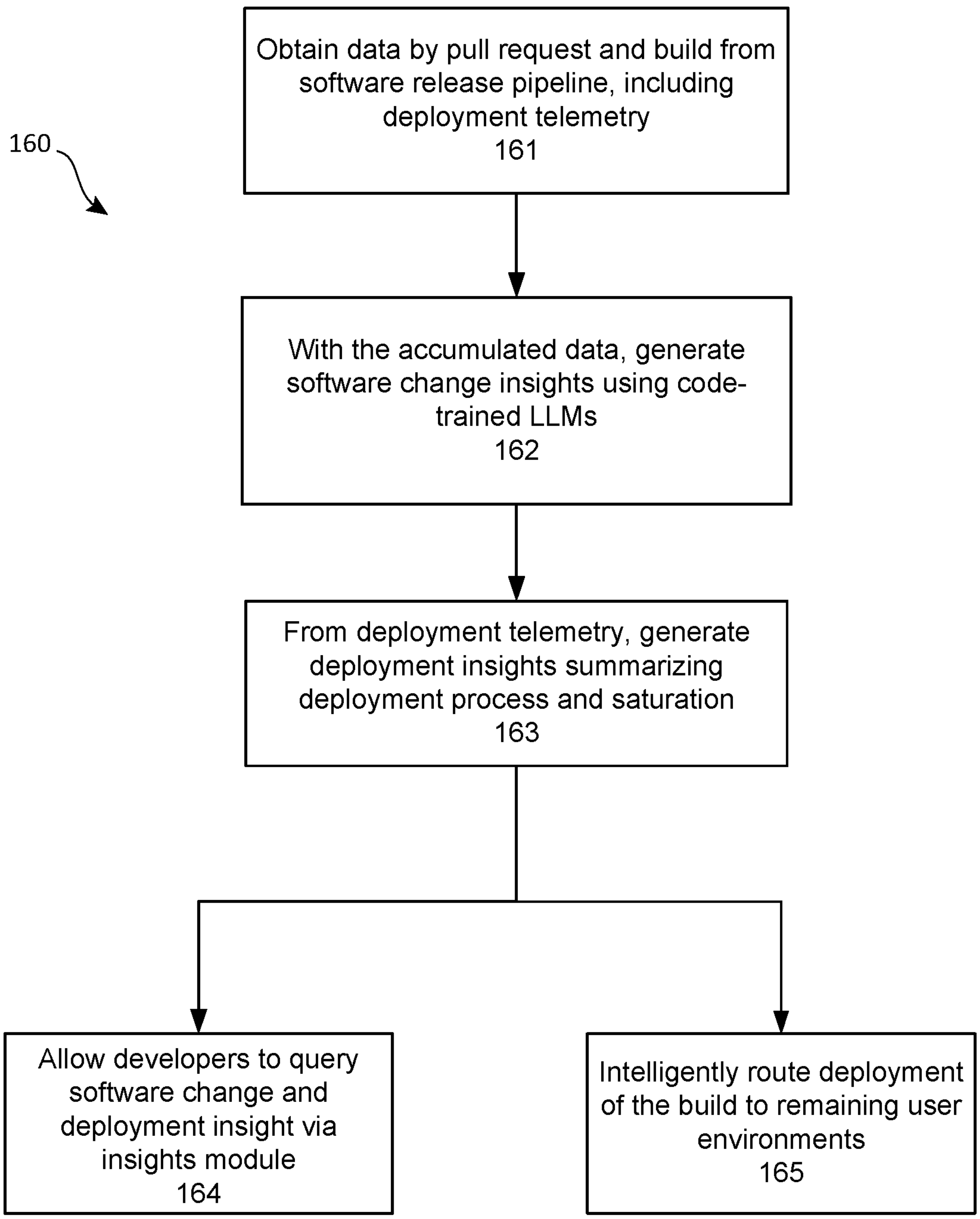
FIG. 6 is a flowchart illustrating an example method according to the techniques described herein.

FIG. 6 is a flowchart illustrating an example method according to the techniques described herein. As shown in FIG. 6, and as described above, the method begins with obtaining data 161 from the software release pipeline. This data includes the code being changed by pull request or build and deployment strategy and telemetry.

With this accumulated data, the method continues to generate software change insights 162. As described above, these insights can be produced by code-trained LLMs corresponding to the different programming languages of various builds being summarized.

Next, using the deployment telemetry, the method will similarly generate deployment insights 163 that summarize the deployment process and saturation. As noted above, these insights can be particularly helpful for an administrator addressing unexpected issues, such as a software crash, that have resulted from the attempted deployment.

This information is also used to make intelligent routing decisions in the deployment of the build to remaining user environments 165. For example, if the build has caused issues in some sub-set of user environments, routing of the build to similar user environments may be delayed with the code change and deployment insights are reviewed to identify and correct the issue. Similarly, based on the categorization of a build, the build may be determined to be of higher priority to some users rather than others. Consequently, routing of the deployment can be prioritized to those identified users. In these and other ways, the described system and method provide for intelligent routing of a build deployment.

Lastly, the software change insights and the deployment insights are retained in a database. Thus, the method permits developers to query this database 164 of insights for information on a particular build or pull request. These queries may be in natural language such that the developer may ask, for example, to retrieve the data pertaining on a build or deployment on a particular date or time, based on the characterization(s) of the build or deployment or other identifying characteristics.

In summary, the described system uses LLM based categorization of builds and releases to intelligently select deployment strategies and route deployments across various customer environments. This will help balance rolling out customer improvements with higher reliability of services and ensure the customer The described system also provides a software change insights module for software builds using pull request information across multiple languages. The system analyzes code changes across different programming languages using code LLMs, engineering discussions and develop a comprehensive summary of the build. This includes intelligently categorizing the builds into change types based on historical data. The system provides smart categories of builds which help filter out the deployments needed for compliance reporting and monitoring in customer environments. The system provides smart insights for false positives of security tools for software languages based on programming languages used for the pull requests. The system also provides automated change categorization based on code summaries and is learns dynamically to integrate any changes in underlying code patterns, software languages used. This solution also automates security posture assessment for industry regulations such as SOC2 by aggregating insights across all the deployments of a service, individual change insights and software development process logs and provides a simple to use natural language-based experience to the end users. The solution helps provide intelligent categories for deployments based on the deployment process logs, deployment artifacts and generate insights based on natural language-based categories to deploy to public clouds.

Figure 7:
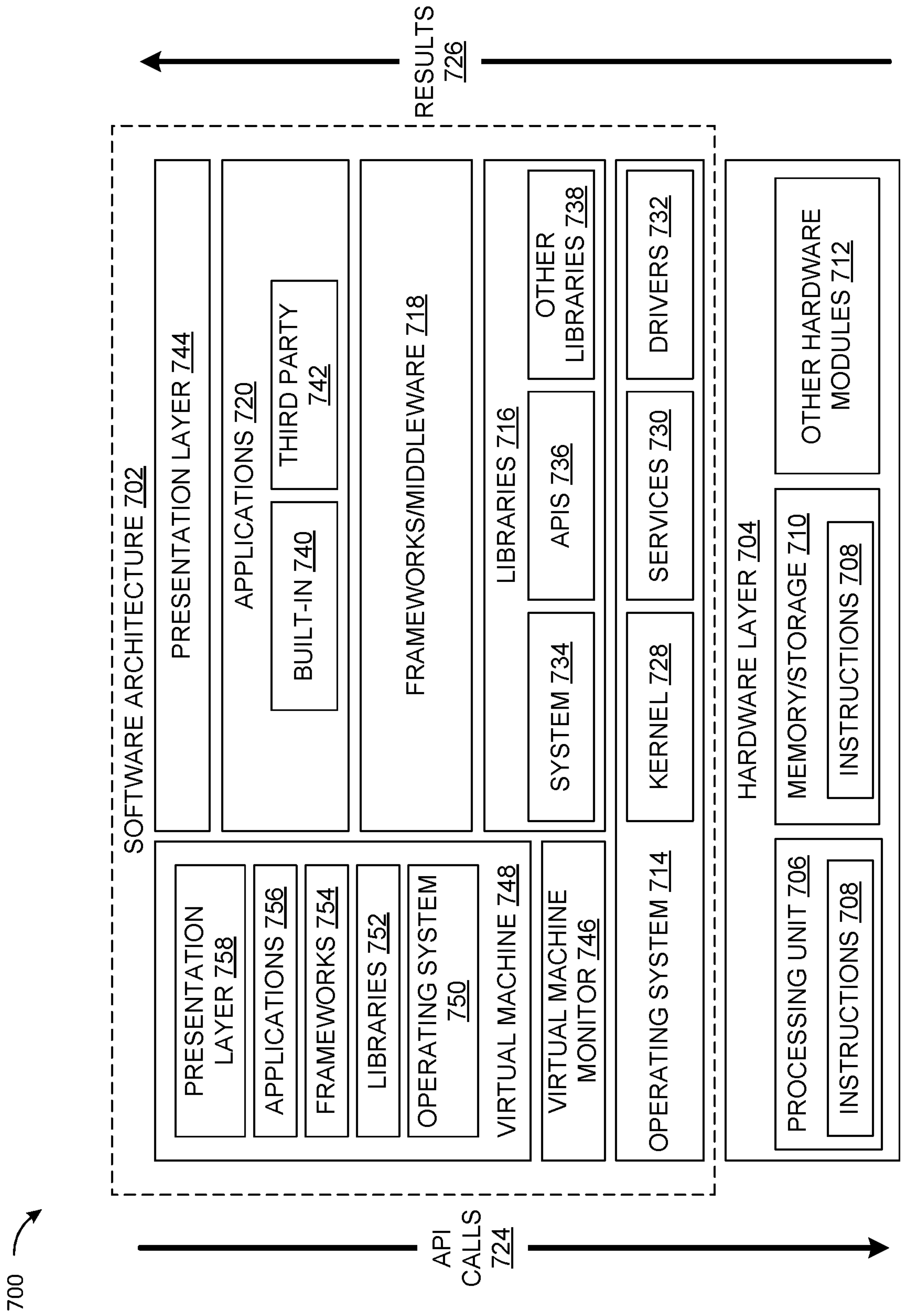
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results

726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
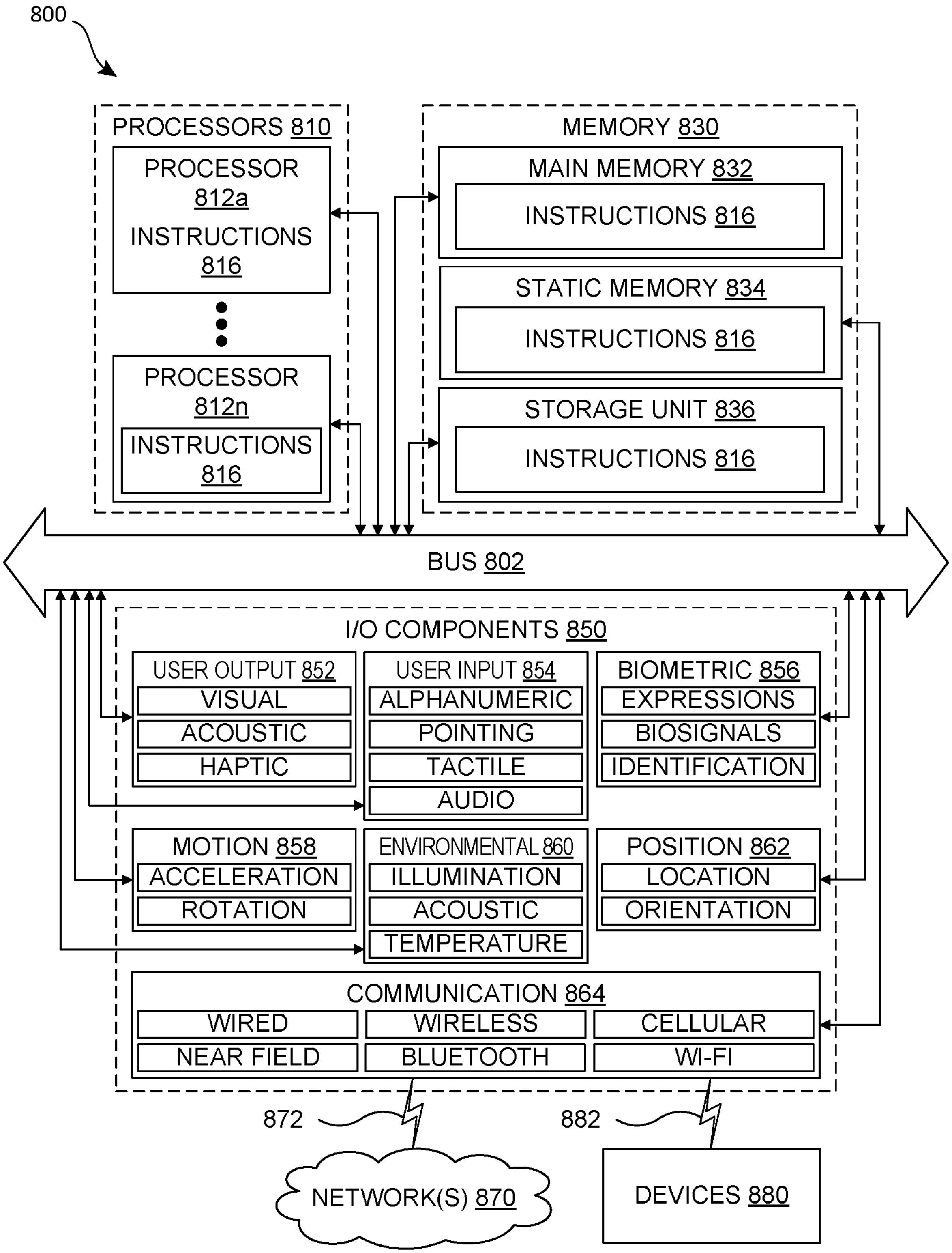
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in the form of a computer system, within which instructions 816 (for example, in the form of software components) for causing the machine 800 to perform any of the features described herein may be executed.

As such, instructions 816 may be used to implement modules or components described herein. Instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101-103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor, and a memory storing executable instructions which, when executed by the processor, causes the processor, alone or in combination with other processors, to implement:

a data platform for extracting data from a software release pipeline for specific software;

a software change insights module to generate insights into changes to the specific software on a per build basis using the extracted data;

a deployment insights module to generate deployment insights using the extracted data, the deployment insights comprising deployment metrics, deployment saturation information, deployment summaries, and deployment type categorizations; and a dashboard to organize the generated deployment insights, and a deployment policy engine configured to route deployment of a build to upgrade the specific software based on the generated insights, wherein the routing comprises selecting target customer environments for deployment of the build based on both the generated software change insights and the generated deployment insights.

2. The data processing system of claim 1, wherein the data platform extracts data from a code source data repository, a build data store and a deployment data store in the software release pipeline.

3. The data processing system of claim 1, wherein the software change insights module identifies commits and pull requests with each build and extracts code changes for each pull request.

4. The data processing system of claim 3, wherein the software change insights module comprises a code summarization module to call a number of Large Language Models (LLMs) trained on programming code, the call comprising a prompt to summarize changes to the specific software based on the extracted code changes.

5. The data processing system of claim 4, wherein the number of LLMs comprises multiple LLMs, each LLM being trained on a different programming language.

6. The data processing system of claim 1, wherein the software change insights module comprises a pull request metrics engine to categorize a code change for each pull request in the software release pipeline.

7. The data processing system of claim 1, wherein the deployment insights module extracts build, saturation and deployment metrics from the software release pipeline.

8. The data processing system of claim 7, wherein the deployment insights module further summarizes a deployment implemented by the software release pipeline using the extracted metrics.

9. The data processing system of claim 1, further comprising an insights module to support the dashboard and to processing administrator queries for insights on a per build basis generated by the software change insights module and deployment insights module.

10. A method comprising:
- extracting data from a software release pipeline for specific software;
- generating insights into changes to the specific software on a per build basis using the extracted data;
- generating deployment insights using the extracted data, the deployment insights comprising deployment metrics, deployment saturation information, deployment summaries, and deployment type categorizations; and
- routing deployment of a build to upgrade the specific software based on the generated deployment insights to expedite deployment, wherein the routing comprises selecting target customer environments for deployment of the build based on both the generated insights into changes to the specific software and the generated deployment insights.

11. The method of claim 10, further comprising extracting data from a code source data repository, a build data store and a deployment data store in the software release pipeline.

12. The method of claim 10, wherein the insights into changes to the specific software are generated by:
- identifying commits and pull requests with each build and extracting code changes for each pull request;
  - calling a number of Large Language Models (LLMs) trained on programming code, the call comprising a prompt to summarize changes to the specific software based on the extracted code changes;
- categorizing a code change for each pull request in the software release pipeline; and
- implementing a build insights dashboard to present a summarization of changes being made to the specific software by the software release pipeline as determined using a number of Large Language Models (LLMs) trained on programming code.

13. The method of claim 12, wherein the number of LLMs comprises multiple LLMs, each LLM being trained on a different programming language.

14. The method of claim 10, wherein the deployment insights are generated by:
- extracting build, saturation and deployment metrics from the software release pipeline;
- summarizing a deployment implemented by the software release pipeline using the extracted metrics;
- categorizing the deployment by type; and
- implementing a deployment insights dashboard to present deployment insights based on the summarization and category of the deployment.

15. A data processing system comprising:
- a processor, and
- a memory storing executable instructions which, when executed by the processor, causes the processor, alone or in combination with other processors, to implement:
- a data platform for extracting data from a software release pipeline for specific software;
- a software change insights module to generate insights into changes to the specific software on a per build basis using the extracted data;
- a deployment insights module to generate deployment insights using the extracted data, the deployment insights comprising deployment metrics, deployment saturation information, deployment summaries, and deployment type categorizations; and
- a dashboard to organize the generated insights and a database to provide the generated insights for software changes and deployments on a per build basis as queried by administrators of the software release pipeline.

16. The data processing system of claim 1, wherein the deployment insights module extracts deployment saturation metrics identifying a percentage of customer environments that have received deployment of a software build, and wherein the routing deployment comprises delaying deployment of the software build to additional customer environments responsive to the deployment saturation metrics indicating failures in previously deployed customer environments.

17. The data processing system of claim 1, further comprising a deployment policy engine configured to orchestrate deployment policies based on deployment insights generated by the deployment insights module, wherein the deployment policy engine selects among multiple deployment strategies based on a categorization assigned to the software build by the software change insights module.

18. The data processing system of claim 1, wherein the deployment insights module retrieves deployment information corresponding to executable build artifacts from a deployment data store to correlate deployment outcomes with pull requests associated with the executable build artifacts.

19. The data processing system of claim 1, wherein the data platform extracts pull request data, source code repository data, build artifacts, deployment telemetry including deployment saturation metrics, software version information, deployment outcomes, security testing information, and deployment process metrics from the software release pipeline.

20. The data processing system of claim 1, wherein the software change insights module generates, for each build, insights identifying pull requests and commits associated with the build, code changes extracted from differences between previous and updated source code, summaries of the code changes generated using one or more Large Language Models (LLMs) trained on programming code, categorizations of change types including bug fixes, features, version changes, upgrades, support changes, security updates, and infrastructure changes, and build approval categorizations identifying whether the build was automatically approved, human approved, or approved using a combination of automatic and human approval.

* * * * *